(12) United States Patent
Kumar et al.

(10) Patent No.: US 7,445,705 B2
(45) Date of Patent: Nov. 4, 2008

(54) PARTICLE FILTER FOR FUEL CELL COOLANT

(75) Inventors: Mukesh Kumar, Canton, MI (US);
Stephen Fan, Northville, MI (US);
George Shih, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 460 days.

(21) Appl. No.: 10/922,610

(22) Filed: Aug. 19, 2004

(65) Prior Publication Data
US 2006/0037894 A1    Feb. 23, 2006

(51) Int. Cl.
*B01D 27/04*    (2006.01)
(52) U.S. Cl. .......................... 210/90; 210/448
(58) Field of Classification Search ............ 210/90, 210/741, 448
See application file for complete search history.

(56) References Cited
U.S. PATENT DOCUMENTS

| | | | |
|---|---|---|---|
| 434,850 A | 8/1890 | Twedell | |
| 551,413 A | 12/1895 | Stevens | |
| 1,662,529 A * | 3/1928 | McKinley | 73/38 |
| 4,702,754 A * | 10/1987 | Blocker | 96/421 |
| 5,489,385 A * | 2/1996 | Raabe et al. | 210/448 |
| 6,651,433 B1 | 11/2003 | George, Jr. | |
| 6,709,779 B2 | 3/2004 | Uozumi | |
| 2003/0158838 A1 | 8/2003 | Yakes et al. | |
| 2003/0203268 A1 | 10/2003 | Yang et al. | |
| 2004/0001984 A1 | 1/2004 | Alva | |
| 2004/0001985 A1 | 1/2004 | Alva | |
| 2004/0053096 A1 | 3/2004 | Takahashi | |
| 2005/0204753 A1 * | 9/2005 | Bartlett et al. | 62/55.5 |

* cited by examiner

*Primary Examiner*—David L Sorkin
(74) *Attorney, Agent, or Firm*—Damian D. Porcari; Tung & Associates

(57) ABSTRACT

A particle filter for a fuel cell coolant is disclosed. The particle filter includes a filter housing having an upstream end for receiving the coolant and a downstream end for discharging the coolant. A filter element is provided in the filter housing. A pressure gauge is operably connected to the upstream end of the filter housing for measuring and indicating a pressure of the coolant corresponding to a degree of blockage of the filter element.

20 Claims, 1 Drawing Sheet

PARTICLE FILTER FOR FUEL CELL COOLANT

FIELD OF THE INVENTION

The present invention relates to fuel cell systems which utilize hydrogen to produce electricity for the powering of a vehicle or other electrical system. More particularly, the present invention relates to a particle filter for filtering particles from a fuel cell coolant to prevent or minimize the plugging of coolant flow channels in a fuel cell stack.

BACKGROUND OF THE INVENTION

In recent years, much research has been devoted to the development of fuel cells as a source of energy for vehicles. In a fuel cell vehicle, a fuel cell stack uses hydrogen gas to produce electricity which powers an electric motor that propels the vehicle. Fuel cell vehicles are environmentally-friendly since they emit only water and heat as by-products.

Fuel cells are provided with a cooling system to dissipate excessive heat from the fuel cell. A fuel cell cooling system typically includes a pump which circulates a liquid coolant through channels in the fuel cell. In a hydrogen fuel cell vehicle, coolant channels in a fuel cell stack are very small in size. When liquid coolant passes through the fuel cell vehicle cooling system, particles may be abstracted from the various plastic, metal and rubber components of the system into the coolant. The coolant carries these particles into the coolant channels of the fuel cell stack. Consequently, the particles have a tendency to block the coolant channels, thereby impeding coolant flow in the fuel cell and causing individual fuel cells in the fuel cell stack to excessively heat up and fail.

Accordingly, a device is needed to filter particles from coolant in a fuel cell and detect the quantity of particles removed from the coolant by the filter by measuring a rise in coolant pressure upstream of the filter. The quantity of particles removed from the filter would be directly correlated with the need to replace the filter in order to maintain optimum filter performance.

SUMMARY OF THE INVENTION

The present invention is generally directed to a particle filter for fuel cell coolant. The particle filter includes a filter housing within which is provided a filter element. As coolant flows through the filter housing, the filter element removes particles from the coolant prior to distribution of the coolant through a fuel cell. A pressure gauge includes a pressure sensor provided upstream of the filter housing to measure the pressure of coolant flowing into the filter housing. A pressure indicator is connected to the pressure sensor. The pressure indicator is calibrated and appropriately marked to indicate the degree to which the filter is clogged with particles according to the magnitude of the upstream filter pressure as measured by the pressure sensor. The pressure indicator includes a marking which indicates an upstream filter pressure that corresponds to a need for servicing the filter.

BRIEF DESCRIPTION OF THE DRAWINGS

The invention will now be described, by way of example, with reference to the accompanying drawings, in which.

DETAILED DESCRIPTION OF THE INVENTION

The present invention contemplates a fuel cell coolant particle filter which removes particles from a fuel cell coolant prior to distribution of the coolant through a fuel cell cooling system. While the fuel cell coolant particle filter is particularly well suited to filtering particles from coolant in a vehicle fuel cell cooling system, it will be recognized that the filter can be adapted to remove particles from a coolant in a fuel cell system which is used to power any type of electrical system.

Figure 1:
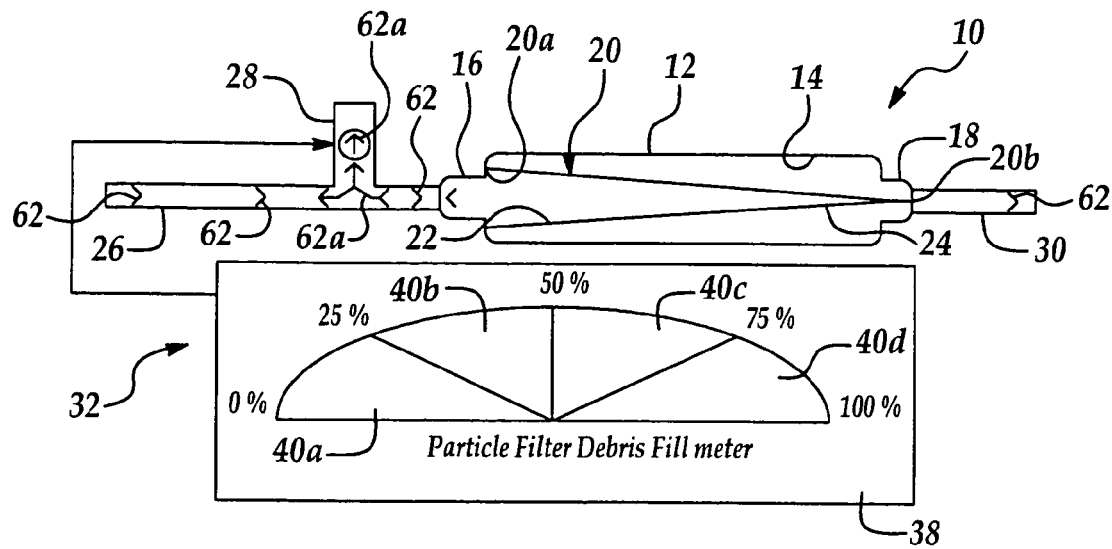
FIG. 1 is a cross-sectional view, partially schematic, of an illustrative embodiment of a particle filter for a fuel cell coolant according to the present invention.

Referring to FIG. 1, an illustrative embodiment of the fuel cell coolant vehicle filter, hereinafter "filter", of the present invention is generally indicated by reference numeral 10. The filter 10 includes a generally elongated, typically cylindrical filter housing 12 which may be metal or plastic, in non-exclusive particular. Preferably, the filter housing 12 is polyvinylidene fluoride (PVDF). The filter housing 12 has a housing interior 14. A housing inlet 16 communicates with the housing interior 14 at one end of the filter housing 12, and a housing outlet 18 communicates with the housing interior 14 at the opposite end of the filter housing 12.

A filter element 20 is provided in the housing interior 14, between the housing inlet 16 and housing outlet 18, and separates the housing interior 14 into a pre-filtered region 22 and a filtered region 24. The filter element 20 may have a generally conical or frustro-conical configuration, as shown, in which case the mouth 20a of the filter element 20 is typically located adjacent to the housing inlet 16 and the apex 20b of the filter element 20 is typically located adjacent to the housing outlet 18. The filter element 20 may be metal, plastic or any other material which is compatible with a fuel cell coolant, which is typically a mixture of 40% by volume ethylene glycol and 60% by volume deionized water. Preferably, the filter element 20 is a 316 stainless steel mesh and is rated for filtering particles at or above the size of 40 microns.

A filter inlet conduit 26 is provided in fluid communication with the housing inlet 16 for distributing a flowing liquid fuel cell coolant 62 into the filter housing 12, as will be hereinafter described. A filter outlet conduit 30 is provided in fluid communication with the housing outlet 18 for distributing the coolant 62 from the filter housing 12. A reverse flow conduit 28 is provided in fluid communication with the filter inlet conduit 26 and extends in generally perpendicular relationship thereto. A coolant reservoir (not shown) may be provided in fluid communication with the reverse flow conduit 28 to receive reverse flowing coolant 62a flowing from the filter inlet conduit 26 into the reverse flow conduit 28, as will be hereinafter further described.

Upon partial or complete blockage of the filter element 20 due to prolonged usage of the filter 10, as will be hereinafter described, reverse flowing coolant 62a flows from the filter inlet conduit 26, into the reverse flow conduit 28. The pressure of the reverse flowing coolant 62a is directly proportional to the degree of blockage of the filter element 20. A pressure gauge 32 is connected to the fuel cell coolant filter 10 to measure and indicate the pressure of reverse flowing coolant 62a in the reverse flow conduit 28 responsive to particle blockage of the filter element 20, as will be hereinafter described. The pressure gauge 32 includes a pressure indicator 38 which is operably connected to the interior of the reverse flow conduit 28 to measure and indicate the pressure of reverse flowing coolant 62a in the reverse flow conduit 28. The pressure indicator 38 may include various indicator regions such as, for example, a first indicator region 40a which corresponds to from 0% to 25% blockage of the filter element 20; a second indicator region 40b which corresponds to from 25% to 50% blockage of the filter element 20; a third indicator region 40c which corresponds to from 50% to 75% blockage of the filter element 20; and a fourth indicator region 40d which corresponds to 75% to 100% blockage of the filter element 20.

The pressure indicator 38 may be a conventional pressure-sensing plate, membrane, diaphragm or coil, for example, which is capable of sensing the pressure of reverse flowing coolant 62a in the reverse flow conduit 28. The various indicator regions 40a-40d may normally be a uniform background color such as white, for example, and change to a selected color upon activation depending on the pressure of the reverse coolant 62a in the reverse flow conduit 28. For example, the first indicator region 40a may change from the uniform background color, such as white, to green when the filter element 20 is unblocked or the pressure of the reverse flowing coolant 62a corresponds to up to a 25% blockage of the filter element 20. Accordingly, the first indicator region 40a is calibrated to change from the uniform background color to green when the pressure indicator 38 senses a pressure of the reverse flowing coolant 62a which results due to a 25% or less blockage of the filter element 20. In similar fashion, the second indicator region 40b may be calibrated to change from the uniform background color to yellow when the pressure indicator 38 senses a pressure of the reverse flowing coolant 62a corresponding to a 25% to 50% blockage of the filter element 20. The third indicator region 40c typically changes from the background color to orange when the coolant pressure corresponds to a 50% to 75% blockage of the filter element 20, and the fourth indicator region 40d typically changes from the background color to red when the coolant pressure corresponds to a 75% to 100% blockage of the filter element 20.

It will be understood that alternative pressure gauges known by those skilled in the art may be used to sense and indicate the pressure of the reverse flowing coolant 62a in the reverse flow conduit 28. For example, the pressure indicator 38 may be provided with an indicator needle (not shown) which moves from left to right responsive to and in proportion to the magnitude of the pressure of the reverse flowing coolant 62a in the reverse flow conduit 28. In that case, the indicator needle would indicate the first indicator region 40a when the filter element 20 is up to 25% blocked; the second indicator region 40b when the filter element 20 is 25% to 50% blocked; the third indicator region 40c when the filter element 20 is 50% to 75% blocked; and the fourth indicator region 40d when the filter element 20 is 75% to 100% blocked.

Figure 2:
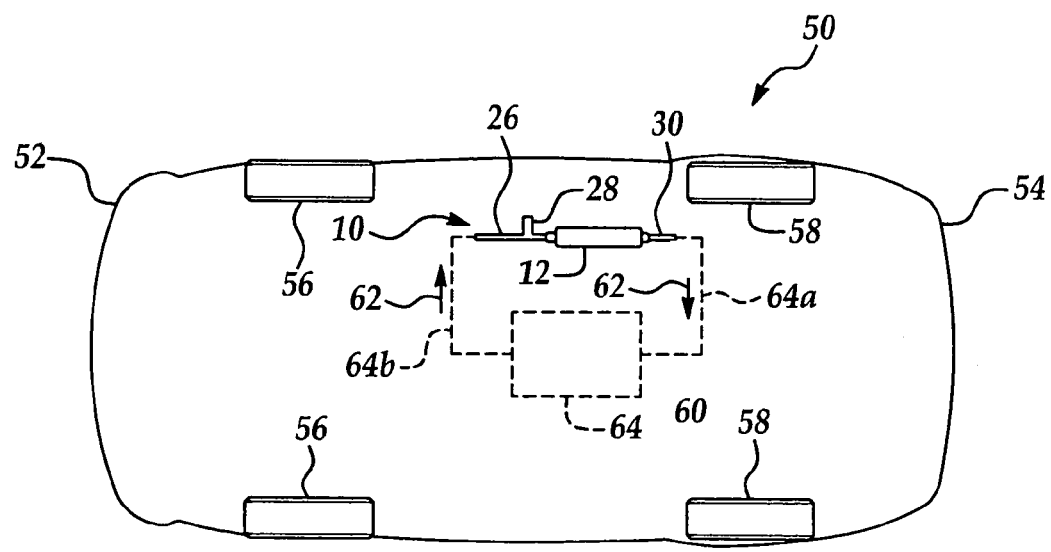
FIG. 2 is a bottom view of a fuel cell vehicle, illustrating typical placement of the particle filter for a fuel cell coolant in the vehicle to facilitate ease in installation and removal.

FIG. 2 illustrates a typical installation position of the fuel cell coolant filter 10 in a fuel cell vehicle 50, a bottom view of which is shown. The fuel cell vehicle 50 includes a front end 52, a rear end 54, a pair of front wheels 56 and a pair of rear wheels 58. Preferably, the filter 10 is mounted in a horizontal position between the front wheels 56 and rear wheels 58 and is accessible from the bottom 60 of the fuel cell vehicle 50. An inlet 64a of the vehicle coolant system 64 (shown in phantom) is connected to the filter outlet conduit 30 of the filter 10, and an outlet 64b of the vehicle coolant system 64 is connected to the filter inlet conduit 26 of the filter 10. Accordingly, the filter 10 is easily accessible on the fuel cell vehicle 50 for servicing, repair or replacement, as needed. The pressure indicator 38 of the pressure gauge 32 is typically provided on the dashboard (not shown) of the fuel cell vehicle 50 or in some other location which is visible to the driver of the fuel cell vehicle 50.

Referring again to FIGS. 1 and 2, in typical operation of the filter 10, coolant 62 flows throughout the vehicle coolant system 64 (FIG. 2) to cool the fuel cell (not shown) of the fuel cell vehicle 50, typically in conventional fashion. The expended coolant 62 flows from the vehicle coolant system 64, through the outlet 64b and into the filter inlet conduit 26 of the filter 10, respectively. When the filter element 20 of the filter 10 is unblocked, the coolant 62 flows unimpeded from the filter inlet conduit 26, through the housing inlet 16 and into the housing interior 14 of the filter housing 12; through the filter element 20; and into the filter outlet conduit 30 through the housing outlet 18, respectively.

As the coolant 62 flows through the filter element 20, particles (not shown) having a size of typically about 40 microns and larger are removed from the coolant 62 and become entrapped in the filter element 20. Therefore, the coolant 62 which emerges from the filter 10 and is distributed back to the vehicle coolant system 64 through the inlet 64a is substantially devoid of particles which would otherwise tend to clog coolant channels in the fuel cell (not shown). From about 95 to 98 percent of contaminant particles are typically removed from the coolant 62 within the first passage of coolant 62 through the filter 10.

When the filter element 20 is substantially unclogged by particles, the coolant 62 tends to flow unimpeded and uni-directionally from the filter inlet conduit 26 and into and through the filter housing 12. Therefore, substantially none of the coolant flows from the filter housing 12 back into the filter inlet conduit 26 and reverse flow conduit 28 as reverse flowing coolant 62a. Accordingly, the pressure gauge 32 measures a coolant pressure of "0" in the reverse flow conduit 28. This coolant pressure is correlated with 0% clogging of the filter element 20. The pressure indicator 38 indicates this unclogged condition of the filter element 20 by imparting the "activation" color (green, in this case) to the first indicator region 40a, while the remaining indicator regions 40b-40d remain in the uniform background color. Accordingly, the pressure indicator 38 is interpreted as indicating either an unclogged condition or a clogged condition of the filter element 20 which ranges from 1% to 25%.

As the filter element 20 becomes progressively clogged by particles throughout prolonged use, some of the coolant begins to flow from the filter housing 12 and back into the filter inlet conduit 26 as reverse flowing coolant 62a as the forward-flowing coolant 62 impinges against the blocked regions of the filter element 20. Some of this reverse flowing coolant 62a flows into the reverse flow conduit 28. The pressure gauge 32 measures the pressure of the reverse flowing coolant 62a in the reverse flow conduit 28, and the pressure indicator 38 indicates the measured pressure as a direct measure of the degree of blockage of the filter element 20.

In the event that the pressure of the reverse flowing coolant 62a corresponds to a blockage of from 1% to 25% of the filter element 20, the first indicator region 40a of the pressure indicator 38 displays the "activation" color (green in this case). In the event that the pressure of the reverse flowing coolant 62a in the reverse flow conduit 28 corresponds to a blockage of from 25% to 50% of the filter element 20, the color of the second indicator region 40b changes from the background color to the "activation" color (yellow in this case). In the event that the pressure of the reverse flowing coolant 62a in the reverse flow conduit 28 corresponds to a blockage of from 50% to 75% of the filter element 20, the color of the third indicator region 40c changes from the background color to the "activation" color (orange in this case). In the event that the pressure of the reverse flowing coolant 62a in the reverse flow conduit 28 corresponds to a blockage of from 75% to 100% of the filter element 20, the color of the fourth indicator region 40d changes from the background color to the "activation" color (red in this case). At that point, activation of the fourth indicator region 40d indicates to a driver (not shown) of the fuel cell vehicle 50 that the fuel cell coolant filter 10 needs to be removed from the vehicle 50 and serviced or replaced.

The filter 10 is preferably constructed in such a manner that it can survive coolant pressures of up to 75 psi without leakage or loss of functionality. The construction of the filter 10 facilitates operation at temperatures of 85 degrees C. without loss of structural integrity. The filter 10 is capable of operation without service for a minimum of one year or 15,000 miles. Preferred operating ranges for the filter 10 include a humidity of between 0% and 100%, an elevation of between −150 meters and 4,570 meters above sea level and a maximum pressure drop of 0.9 psi at 4,500 pump rpm and flow of 25.5 gpm.

While the preferred embodiments of the invention have been described above, it will be recognized and understood that various modifications can be made in the invention and the appended claims are intended to cover all such modifications which may fall within the spirit and scope of the invention.

What is claimed is:

1. A particle filter adapted to filter a fuel cell coolant, comprising:
   a filter housing having an upstream end for receiving the coolant and a downstream end for discharging the coolant;
   a replaceable filter element provided in said filter housing, said filter element positioned adjacent an inlet comprising said upstream end and adjacent an outlet comprising said downstream end; and
   a pressure gauge operably connected to said upstream end of said filter housing, said pressure gauge operably connected to measure and indicate only a pressure of the coolant proportional to a degree of particle blockage of said filter element, said pressure gauge indicating zero coolant pressure when said particle blockage is absent.

2. The particle filter of claim 1 wherein said filter element is generally conical and includes a mouth of said cone adjacent to said upstream end and an apex of said cone adjacent to said downstream end of said filter housing.

3. The particle filter of claim 2 wherein said filter element is a stainless steel mesh.

4. The particle filter of claim 3 wherein said filter element has a 40 micron screening capability.

5. The particle filter of claim 1 wherein said pressure gauge comprises a pressure indicator and a plurality of indicator regions provided on said pressure indicator for indicating pressures of the coolant corresponding to degrees of blockage of said filter element.

6. The particle filter of claim 5 wherein said plurality of indicator regions comprises a first indicator region for indicating a blockage of from 0 to 25% of said filter element, a second indicator region for indicating a blockage of from 25% to 50% of said filter element, a third indicator region for indicating a blockage of from 50% to 75% of said filter element, and a fourth indicator region for indicating a blockage of from 75% to 100% of said filter element.

7. The particle filter of claim 1 further comprising a reverse flow conduit provided in fluid communication with said upstream end of said filter housing and wherein said pressure gauge is connected to said reverse flow, conduit.

8. The particle filter of claim 7 wherein said reverse flow conduit is disposed at substantially a 90-degree angle with respect to a longitudinal axis of said filter housing.

9. A particle filter adapted to filter a fuel cell coolant, comprising:
   a filter housing having an upstream housing inlet for receiving the coolant and a downstream housing outlet for discharging the coolant;
   a replaceable filter element provided in said filter housing, said filter element positioned adjacent said upstream housing inlet and said downstream housing outlet;
   a filter inlet conduit provided in fluid communication with said housing inlet of said filter housing;
   a reverse flow conduit provided in fluid communication with said filter inlet conduit; and
   a pressure gauge operably connected to said reverse flow conduit, said pressure gauge operably connected to measure and indicate a pressure of reverse flowing coolant proportional to a degree of particle blockage of said filter element, said pressure gauge indicating zero coolant pressure when said particle blockage is absent.

10. The particle filter of claim 9 wherein said filter element is generally conical and includes a mouth adjacent to said upstream housing inlet and an apex adjacent to said downstream housing outlet of said filter housing.

11. The particle filter of claim 10 wherein said filter element is a stainless steel mesh.

12. The particle filter of claim 11 wherein said filter element has a 40 micron screening capability.

13. The particle filter of claim 9 wherein said pressure gauge comprises a pressure indicator and a plurality of indicator regions provided on said pressure indicator for indicating pressures of the coolant corresponding to degrees of blockage of said filter element.

14. The particle filter of claim 13 wherein said plurality of indicator regions comprises a first indicator region for indicating a blockage of from 0 to 25% of said filter element, a second indicator region for indicating a blockage of from 25% to 50% of said filter element, a third indicator region for indicating a blockage of from 50% to 75% of said filter element, and a fourth indicator region for indicating a blockage of from 75% to 100% of said filter element.

15. The particle filter of claim 14 wherein said filter element is generally conical and includes a mouth adjacent to said upstream housing inlet and an apex adjacent to said downstream housing outlet of said filter housing.

16. The particle filter of claim 9 wherein said reverse flow conduit is disposed at substantially a 90 degree angle with respect to a longitudinal axis of said filter housing.

17. A particle filter adapted to filter a fuel cell coolant, comprising:
   a filter housing having an upstream end for receiving the coolant and a downstream end for discharging the coolant;
   a replaceable filter element provided in said filter housing, said filter element positioned adjacent an inlet comprising said upstream end and adjacent an outlet comprising said downstream end;
   a pressure gauge operably connected to said upstream end of said filter housing, said pressure gauge operably connected to measure and indicate a pressure of the coolant proportional to a degree of particle blockage of said filter element, said pressure gauge indicating zero coolant pressure when said particle blockage is absent;
   wherein said filter element is generally conical and includes a mouth of said cone adjacent to said upstream end and an apex of said cone adjacent to said downstream end of said filter housing.

18. The particle filter of claim 17 wherein said filter element is a stainless steel. mesh.

19. The particle filter of claim 17 wherein said filter element has a 40 micron screening capability.

20. The particle filter of claim 17 wherein said pressure gauge comprises a pressure indicator and a plurality of indicator regions provided on said pressure indicator for indicating pressures of the coolant corresponding to degrees of blockage of said filter element.

* * * * *